US008642688B2

(12) United States Patent
Jung et al.

(10) Patent No.: US 8,642,688 B2
(45) Date of Patent: Feb. 4, 2014

(54) GLASS FIBER REINFORCED POLYCARBONATE RESIN COMPOSITION

(75) Inventors: Chang Do Jung, Uiwang-si (KR); Jun Hong Park, Gunsan-si (KR); Hyo Seon Jeong, Yeosu-si (KR)

(73) Assignee: Cheil Industries Inc., Gumi-si (KR)

(*) Notice: Subject to any disclaimer, the term of this patent is extended or adjusted under 35 U.S.C. 154(b) by 0 days.

(21) Appl. No.: 13/328,538

(22) Filed: Dec. 16, 2011

(65) Prior Publication Data

US 2012/0172508 A1    Jul. 5, 2012

(30) Foreign Application Priority Data

Dec. 29, 2010  (KR) .................. 10-2010-0137669

(51) Int. Cl.
*C08L 69/00* (2006.01)
*C08L 23/28* (2006.01)
*C08L 83/04* (2006.01)
*C08K 13/04* (2006.01)
*C08K 5/5419* (2006.01)
*C08K 5/42* (2006.01)

(52) U.S. Cl.
USPC ............................ 524/162; 524/267; 524/165

(58) Field of Classification Search
None
See application file for complete search history.

(56) References Cited

U.S. PATENT DOCUMENTS

| | | | |
|---|---|---|---|
| 2,999,846 A | 9/1961 | Schnell et al. | |
| 3,028,365 A | 4/1962 | Schnell et al. | |
| 3,271,367 A | 9/1966 | Schnell et al. | |
| 4,335,032 A | 6/1982 | Rosenquist | |
| 4,452,968 A | 6/1984 | Bolon et al. | |
| 5,116,905 A | 5/1992 | Belfoure et al. | |
| 5,266,618 A | 11/1993 | Watanabe et al. | |
| 5,391,648 A | 2/1995 | Yamamoto et al. | |
| 5,449,710 A * | 9/1995 | Umeda et al. | 524/165 |
| 5,837,757 A | 11/1998 | Nodera et al. | |
| 5,902,539 A | 5/1999 | Schmidt et al. | |
| 6,063,844 A | 5/2000 | Barren et al. | |
| 6,184,312 B1 * | 2/2001 | Yamamoto et al. | 525/474 |
| 6,194,536 B1 | 2/2001 | Schmidt et al. | |
| 6,197,857 B1 | 3/2001 | Nodera et al. | |
| 6,518,357 B1 * | 2/2003 | Rajagopalan et al. | 524/588 |
| 6,548,624 B2 * | 4/2003 | Mitsuta et al. | 528/196 |
| 6,602,938 B1 | 8/2003 | Iji et al. | |
| 6,664,313 B2 | 12/2003 | Hirai et al. | |
| 6,716,952 B1 * | 4/2004 | Matsumoto et al. | 528/10 |
| 6,790,887 B1 * | 9/2004 | Nishihara | 524/120 |
| 6,838,502 B1 | 1/2005 | Nodera et al. | |
| 7,001,945 B2 * | 2/2006 | Nodera et al. | 524/451 |
| 7,060,780 B2 * | 6/2006 | Miyamoto et al. | 528/196 |
| 7,115,677 B2 * | 10/2006 | Harashina et al. | 523/205 |
| 7,183,342 B2 * | 2/2007 | Miyamoto et al. | 524/161 |
| 7,786,196 B2 | 8/2010 | Jung et al. | |
| 7,939,591 B2 | 5/2011 | Tomoda | |
| 2002/0055563 A1 * | 5/2002 | Asano et al. | 524/100 |
| 2002/0146550 A1 | 10/2002 | Hirai et al. | |
| 2003/0181573 A1 | 9/2003 | Miyatake et al. | |
| 2004/0220302 A1 | 11/2004 | Saegusa et al. | |
| 2004/0249072 A1 | 12/2004 | Warth et al. | |
| 2004/0260035 A1 | 12/2004 | Dairanieh et al. | |
| 2004/0266916 A1 * | 12/2004 | Harashina et al. | 523/217 |
| 2005/0143532 A1 | 6/2005 | Fonseca et al. | |
| 2005/0245670 A1 * | 11/2005 | Sato | 524/537 |
| 2005/0286397 A1 * | 12/2005 | Inagaki | 369/272.1 |
| 2006/0052519 A1 * | 3/2006 | Nodera et al. | 524/588 |
| 2007/0072960 A1 | 3/2007 | Ma et al. | |
| 2007/0191518 A1 | 8/2007 | Chen et al. | |
| 2007/0208128 A1 | 9/2007 | Jung et al. | |
| 2008/0004373 A1 | 1/2008 | Volkers et al. | |
| 2008/0076866 A1 | 3/2008 | Mitsuhashi et al. | |
| 2009/0239975 A1 | 9/2009 | Jung et al. | |
| 2009/0306275 A1 | 12/2009 | Inagaki | |
| 2010/0157217 A1 | 6/2010 | Kim et al. | |
| 2011/0060084 A1 * | 3/2011 | Jung et al. | 524/387 |
| 2011/0306712 A1 * | 12/2011 | Inagaki | 524/165 |

FOREIGN PATENT DOCUMENTS

| | | |
|---|---|---|
| JP | 1972-40445 | 4/1972 |
| JP | 1985-38418 | 2/1985 |
| JP | 09-012853 A | 1/1997 |
| JP | 2003-213114 A | 7/2003 |
| JP | 3871307 | 10/2006 |
| KR | 10-2005-0120238 | 12/2005 |
| KR | 10-0575258 B1 | 4/2006 |
| KR | 10-0782265 B1 | 11/2007 |
| KR | 10-0804173 B1 | 2/2008 |
| KR | 10-2008-0062503 | 7/2008 |
| WO | 98/24844 A1 | 6/1998 |
| WO | 2007/078035 A1 | 7/2007 |
| WO | 2008/082202 A1 | 7/2008 |
| WO | 2009/139535 A1 | 11/2009 |

OTHER PUBLICATIONS

European Search Report in counterpart European Application No. 11195315.4 date May 10, 2012, pp. 1-5.
Database WPI, Abstract for Korean Publication No. 2005-0120238, Thomson Scientific, London, GB, dated May 4, 2012, pp. 1.
International Search Report in commonly owned International Application No. PCT/KR2008/007905 dated Aug. 12, 2009, pp. 1-2.
Taiwanese Office Action in commonly owned Taiwanese Application No. 096151464 mailed Sep. 19, 2011, pp. 1-6.
English Translation of Taiwanese Office Action in commonly owned Taiwanese Application No. 096151464 mailed Sep. 19, 2011, pp. 1-5.

(Continued)

*Primary Examiner* — Robert S Loewe
(74) *Attorney, Agent, or Firm* — Additon, Higgins, Pendleton & Ashe, P.A.

(57) ABSTRACT

A glass fiber reinforced polycarbonate resin composition includes (A) a glass fiber reinforced polycarbonate, (B) a mixture of two kinds of organic silicone based compounds comprising (b1) a siloxane based compound and (b2) a silicone based resin, (C) a metal salt based flame retardant, and (D) a fluorinated polyolefin based resin and can have excellent flame retardancy and impact resistance.

13 Claims, No Drawings

(56) References Cited

OTHER PUBLICATIONS

Office Action in commonly owned U.S. Appl. No. 12/633,081 mailed Oct. 27, 2011, pp. 1-14.
International Search Report and Written Opinion in commonly owned International Application No. PCT/KR2007/006967, mailed on Jan. 21, 2008, pp. 1-3.
Office Action in commonly owned U.S. Appl. No. 12/478,867 mailed Nov. 22, 2010, pp. 1-13.
Final Office Action in commonly owned U.S. Appl. No. 12/478,867 mailed Apr. 19, 2011, pp. 1-11.
Advisory Action in commonly owned U.S. Appl. No. 12/478,867 mailed Jul. 28, 2011, pp. 1-6.
Office Action in commonly owned U.S. Appl. No. 12/478,867 mailed Dec. 14, 2011, pp. 1-18.
European Search Report in commonly owned European Application Serial No. 08874296.0 mailed Aug. 2, 2012, pp. 1-6.
Office Action in commonly owned U.S. Appl. No. 12/944,972 mailed Mar. 15, 2013, pp. 1-11.

* cited by examiner

GLASS FIBER REINFORCED POLYCARBONATE RESIN COMPOSITION

CROSS-REFERENCE TO RELATED APPLICATIONS

This application claims priority under 35 USC Section 119 to and the benefit of Korean Patent Application No. 10-2010-0137669 filed in the Korean Intellectual Property Office on Dec. 29, 2010, the entire disclosure of which is incorporated herein by reference.

FIELD OF THE INVENTION

The present invention relates to a glass fiber reinforced polycarbonate resin composition which can have excellent flame retardancy.

BACKGROUND OF THE INVENTION

Glass fiber reinforced polycarbonate resins can have excellent mechanical strength, heat resistant and the like, and accordingly have been used for electric/electronic parts and other applications requiring high heat resistance and dimensional stability.

Conventionally, halogen based flame retardants, phosphoric compounds, or antimony compounds have been used to impart flame retardancy to polycarbonate resins. However, the use of halogen based flame retardants has been strictly limited because of gases generated during combustion, which are harmful to the human body. Phosphoric acid ester based flame retardants, which are examples of phosphoric compound flame retardants, can deteriorate heat resistance and mechanical strength, and thus the use of phosphoric acid ester based flame retardants has been limited.

Metal salt based flame retardants do not include a halogen compound and further can impart high heat resistance and flame retardancy. However, it can be difficult to impart a flame retardancy rating of V0 (measured in accordance with the UL 94 flameproof test using a 1.5 mm thick specimen) to a glass fiber reinforced polycarbonate resin using only the metal salt based flame retardant because of the glass fiber itself.

In this regard, the flame retardancy of glass fiber reinforced polycarbonate resin is significantly deteriorated due to the high thermal conductivity of the glass fiber. Accordingly, the glass fiber can conduct heat into the resin and in this manner can deteriorate the flame retardancy of the resin.

To solve this problem, an organic silicone based compound can be used along with the flame retardant. The silicone based compound, however, should be used in an amount of 2.0% by weight or more to achieve a V0 flame retardancy rating. However, adding 2.0 parts by weight or more of the organic silicone based compound to the resin can deteriorate flexural strength, flexural modulus and thermal resistance, and, in the case of a liquid phase silicone based oil, productivity.

Japanese Patent Publication No. 1972-40445 is directed to a method of improving the flameproof properties of an aromatic polycarbonate without using a brominated flame retardant. The method includes mixing aromatic polycarbonate with an alkali metal salt or alkaline earth metal salt of perfluoroalkane sulfonic acid. Japanese Patent Publication No. 1985-38418 is directed to a method of mixing aromatic polycarbonate with organic alkali metallic salt or alkaline earth metallic salt and polytetrafluoroethylene to prevent dripping during combustion. However, these aromatic polycarbonate resin compositions do not include glass fiber.

US Patent Application Publication No. 2007/0191518 is directed to a flameproof resin composition comprising polycarbonate, glass fiber, polysiloxane-polycarbonate copolymer, aromatic sulfone sulfonate, such as potassium diphenylsulfone sulfonate, and aromatic sulfonate such as sodium salt of toluene sulfonic acid. The examples in this application include only 9 parts by weight of the glass fiber, and it is well known in the art that the flame retardancy of a polycarbonate resin including glass fiber significantly deteriorates with increasing amounts of glass fiber. Also, the publication requires a polysiloxane-polycarbonate copolymer and aromatic sulfonate to increase flame retardancy.

Korean Application Publication No. 10-2005-0120238 is directed to a flameproof resin composition comprising polycarbonate, glass fiber, a metal salt of perfluoroalkane sulfonic acid and a polyorganosilsesquioxane based silicone compound. However, the composition requires the polyorganosilsesquioxane based silicone compound and further includes only 2 to 8 parts by weight of the glass fiber to achieve a V0 rating measured in accordance with the UL94 flame retardancy test.

Korean Application Publication No. 10-2008-0062503 is directed to a composition comprising polycarbonate resin, fluorinated polyolefin based resin, a metal salt of perfluoroalkane sulfonic acid, and an organic siloxane polymer. However, this composition does not include glass fiber. Moreover, this composition includes only one kind of polymethylphenylsiloxane in an amount of 2 to 3 parts by weight.

SUMMARY OF THE INVENTION

One embodiment of the present invention provides a glass fiber reinforced polycarbonate resin composition. The glass fiber reinforced polycarbonate resin composition can have excellent flame retardancy and impact resistance.

A glass fiber reinforced polycarbonate resin composition according to the present invention comprises (A) a glass fiber reinforced polycarbonate resin, (B) a mixture of two kinds of organic silicone based compounds comprising (b1) a siloxane based compound and (b2) a silicone based resin, (C) a metal salt based flame retardant, and (D) a fluorinated polyolefin based resin.

In exemplary embodiments of the present invention, the glass fiber reinforced polycarbonate resin composition can include relatively small amounts of the mixture of two kinds of organic silicone based compound (B), for example, about 0.2 to about 1.5 parts by weight (B) based on about 100 parts by weight of the glass fiber reinforced polycarbonate resin (A).

The glass fiber reinforced polycarbonate resin composition of the present invention can surprisingly exhibit excellent flame retardancy, even though the polycarbonate resin includes glass fibers. Further, the glass fiber reinforced polycarbonate resin composition of the present invention can surprisingly exhibit excellent flame retardancy even though the mixture of organic silicone based compounds (B) is used in a small amount, for example about 1.5 parts by weight or less.

In exemplary embodiments of the present invention, the mixture of two kinds of organic silicone based compound (B) is limited to only (b1) a siloxane based compound and (b2) a silicone based resin. Stated differently, the mixture of two kinds of organic silicone based compound (B) does not include any other types of organic silicone based compounds other than (b1) the siloxane based compound and (b2) the silicone based resin as a part of the mixture (B). Further, the glass fiber reinforced polycarbonate resin composition as a whole also does not include any other types of organic silicone based compounds other than (b1) the siloxane based compound and (b2) the silicone based resin.

For example, the mixture of two kinds of organic silicone based compound (B) and the glass fiber reinforced polycarbonate resin composition as a whole does not include a polyorganosilsesquioxane based silicone compound and/or an aromatic sulfone sulfonate.

In exemplary embodiments of the present invention, the glass fiber reinforced polycarbonate resin composition can include the metal salt based flame retardant (C) in an amount of about 0.03 to about 0.5 parts by weight, based on about 100 parts by weight of the glass fiber reinforced polycarbonate resin (A).

In exemplary embodiments of the present invention, the glass fiber reinforced polycarbonate resin composition can include the fluorinated polyolefin based resin (D) in an amount of about 0.1 to about 0.5 parts by weight, based on about 100 parts by weight of the glass fiber reinforced polycarbonate resin (A).

In exemplary embodiments of the present invention, the glass fiber reinforced polycarbonate resin (A) can comprise (a1) about 60 to about 95% by weight of a polycarbonate resin, and (a2) about 5 to about 40% by weight of a glass fiber, based on 100% by weight of the glass fiber reinforced polycarbonate resin (A).

In exemplary embodiments of the present invention, the siloxane based compound (b1) is represented by following Chemical Formula 1:

[Chemical Formula 1]

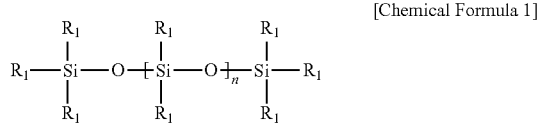

wherein:

each $R_1$ is the same or different and is independently $C_1$-$C_8$ alkyl, $C_6$-$C_{36}$ aryl or $C_1$-$C_8$ alkyl substituted $C_6$-$C_{36}$ aryl; and n represents a number of repeating units and is an integer of 1 to 10,000.

In exemplary embodiments of the present invention, the silicone based resin (b2) is represented by following Chemical Formula 2:

[Chemical Formula 2]

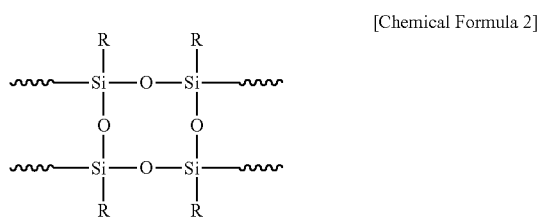

wherein each R is the same or different and is independently hydrogen, $C_1$-$C_{20}$ alkyl, $C_1$-$C_{20}$ alkylene, $C_6$-$C_{36}$ aryl, $C_6$-$C_{36}$ arylene, or a derivative of $C_1$-$C_8$ alkyl, $C_6$-$C_{36}$ alkylene or $C_6$-$C_{36}$ arylene.

In exemplary embodiments of the present invention, the siloxane based compound (b1) may be a poly-dimethyl-diphenylene siloxane.

In exemplary embodiments of the present invention, the silicone based resin (b2) may be a methylphenyl silicone resin.

In exemplary embodiments of the present invention, the metal salt based flame retardant (C) may be potassium perfluorobutane sulfonate, potassium diphenylsulfonesulfonate, or a combination thereof.

In exemplary embodiments of the present invention, the glass fiber reinforced polycarbonate resin composition can have a flame retardancy rating of V0 as measured using the UL94 flame retardancy test with a specimen thickness of 1.5 mm.

In exemplary embodiments of the present invention, the glass fiber reinforced polycarbonate resin composition may further comprise one or more additives selected from the group consisting of coupling agents, UV absorbers, inorganic additives, flame retardants, lubricants, plasticizers, heat stabilizers, antioxidants, light-stabilizers, pigments, dyes, release agents and mixtures thereof.

DETAILED DESCRIPTION OF THE INVENTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

A glass fiber reinforced polycarbonate resin composition according to the present invention comprises (A) a glass fiber reinforced polycarbonate resin, (B) a mixture of two kinds of organic silicone based compounds comprising (b1) a siloxane based compound and (b2) a silicone based resin, (C) a metal salt based flame retardant, and (D) a fluorinated polyolefin based resin.

(A) Glass Fiber Reinforced Polycarbonate Resin

The glass fiber reinforced polycarbonate resin (A) of the present invention comprises (a1) a polycarbonate resin as a matrix and (a2) a glass fiber as a reinforcing agent.

(a1) Polycarbonate Resin

The polycarbonate resin of the present invention can be prepared by any suitable conventional methods well known to a person of ordinary skill in the art.

In exemplary embodiments of the present invention, the polycarbonate resin is prepared by reacting dihydric phenol with phosgene in the presence of a molecular weight controlling agent and a catalyst, or is prepared by transesterification of a dihydric phenol and a carbonate precursor such as diphenylcarbonate.

In exemplary embodiments of the present invention, the dihydric phenol can comprise bisphenol, such as but not limited to 2,2-bis(4-hydroxyphenyl)propane (bisphenol A). The bisphenol A may be partially or totally substituted with other dihydric phenols. Other non-limiting examples of dihydric phenols suitable for use in the present invention may include hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfon, bis(4-hydroxyphenyl)sulfoxide, bis(4-hydroxyphenyl)ketone, bis(4-hydroxyphenyl)ether, and the like, halogenated bisphenols such as 2,2-bis(3,5-dibromo-4-hydroxyphenyl)propane, and the like, and combinations thereof.

The polycarbonate resin used in the present invention may be a homopolymer or a copolymer of two or more types of dihydric phenols, or a combination thereof.

Other non-limiting examples of polycarbonate resins suitable for use in the present invention may also include linear polycarbonates, branched polycarbonates, polyester carbonate copolymers, silicon copolymer polycarbonates, and the like, and combinations thereof.

An example of an exemplary linear polycarbonate resin is bisphenol A based polycarbonate resin.

The branched polycarbonate can be prepared by reacting polyfunctional aromatic compounds such as trimelitic anhydride, trimelitic acid and the like, with dihydroxyphenol and carbonate precursor.

The polyester carbonate copolymer may also be prepared by reacting difunctional carboxylic acid with dihydric phenol and a carbonate precursor.

The weight average molecular weight (Mw) of the polycarbonate resin can range from about 10,000 to about 200,000, for example, from about 15,000 to about 80,000, but not limited thereto.

(a2) Glass Fiber

The glass fiber suitable for use in the present invention can be selected from commercially available glass fibers or can be produced by methods well known in the art.

The present invention is not limited to a particular type, shape or cross section configuration of the glass fiber. Exemplary glass fibers useful in the invention include without limitation glass fiber with a round cross sectional shape. The present invention, however, is not limited to round fibers, and the shape of the fiber can vary depending on the particular end uses of the composition.

In exemplary embodiments of the present invention, the glass fiber can include round-shaped glass fiber with a length of about 3 to about 6 mm and a diameter of about 10 to about 20 μm.

In the present invention, the glass fiber can be treated with a surface-treating agent in order to prevent the glass fiber from reacting with the polycarbonate resin and to improve the degree of impregnation. Coupling agents can be used as the surface-treating agent and suitable glass fiber surface treating methods can be readily carried out by those skilled in the art. In exemplary embodiments, the coupling agent can be a silane coupling agent.

In exemplary embodiments of the invention, the glass fiber reinforced polycarbonate resin can comprise about 60 to about 95% by weight of a polycarbonate resin and about 5 to about 40% by weight of a glass fiber, based on 100% by weight of the glass fiber reinforced polycarbonate resin (A).

In some embodiments, the glass fiber reinforced polycarbonate resin (A) can include the polycarbonate resin in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the amount of polycarbonate resin can be in a range from about any of the foregoing amounts to about any other of the foregoing amounts.

In some embodiments, the glass fiber reinforced polycarbonate resin (A) can include the glass fiber in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments of the present invention, the amount of glass fiber can be in a range from about any of the foregoing amounts to about any other of the foregoing amounts.

(B) Mixture of Two Kinds of Organic Silicone Based Compounds Comprising (b1) a Siloxane Based Compound and (b2) a Silicone Based Resin.

In exemplary embodiments of the present invention, the siloxane based compound (b1) is represented by following Chemical Formula 1:

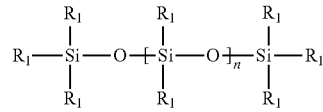

[Chemical Formula 1]

wherein:
each $R_1$ is the same or different and is independently $C_1$-$C_8$ alkyl, $C_6$-$C_{36}$ aryl or $C_1$-$C_8$ alkyl substituted $C_6$-$C_{36}$ aryl; and
n represents a number of repeating units and is an integer of 1 to 10,000.

Examples of the siloxane based compounds (b1) can include without limitation poly-dimethyl-diphenylene siloxane. Poly-dimethyl-diphenylene siloxane with any amount of phenyl or any molecular weight can be used.

In exemplary embodiments of the present invention, the silicone based resin (b2) is represented by following Chemical Formula 2:

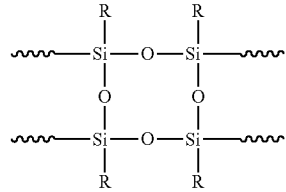

[Chemical Formula 2]

wherein each R is the same or different and is independently hydrogen, $C_1$-$C_{20}$ alkyl, $C_1$-$C_{20}$ alkylene, $C_6$-$C_{36}$ aryl, $C_6$-$C_{36}$ arylene, or a derivative of $C_1$-$C_{20}$ alkyl, $C_1$-$C_{20}$ alkylene or $C_6$-$C_{36}$ arylene.

Examples of the silicone based resin (b2) can include without limitation methylphenyl silicone resin. Methylphenyl silicone resin with any amount of phenyl or any molecular weight can be used.

In exemplary embodiments of the present invention, the mixture of two kinds of organic silicone based compound (B) is limited to only (b1) a siloxane based compound and (b2) a silicone based resin. Stated differently, the mixture of two kinds of organic silicone based compound (B) does not include any other types of organic silicone based compounds other than (b1) the siloxane based compound and (b2) the silicone based resin as a part of the mixture (B). Further, the glass fiber reinforced polycarbonate resin composition as a whole also does not include any other types of organic silicone based compounds other than (b1) the siloxane based compound and (b2) the silicone based resin. For example, the mixture of two kinds of organic silicone based compound (B) and the glass fiber reinforced polycarbonate resin composition as a whole does not include a polyorganosilsesquioxane based silicone compound and/or an aromatic sulfone sulfonate. Yet despite the use of only the two organic silicone based compounds (b1) and (b2), the glass fiber reinforced polycarbonate resin composition can still exhibit excellent flame retardancy properties.

In exemplary embodiments of the present invention, the glass fiber reinforced polycarbonate resin composition can include the mixture of two kinds of organic silicone based compound (B) in an amount of about 0.2 to about 1.5 parts by weight based on about 100 parts by weight of the glass fiber reinforced polycarbonate resin (A). In some embodiments, the glass fiber reinforced polycarbonate resin composition can include the mixture of two kinds of organic silicone based compound (B) in an amount of about 0.2, 0.3, 0.4, 0.5, 0.6, 0.7, 0.8, 0.9, 1.0, 1.1, 1.2, 1.3, 1.4, or 1.5 parts by weight. Further, according to some embodiments of the present invention, the amount of the mixture of two kinds of organic silicone based compound (B) can be in a range from about any of the foregoing amounts to about any other of the foregoing amounts.

In exemplary embodiments of the present invention, the glass fiber reinforced polycarbonate resin composition can include the siloxane based compound (b1) in an amount of about 0.1 to about 1.4 parts by weight based on about 100 parts by weight of the glass fiber reinforced polycarbonate (A). In some embodiments, the glass fiber reinforced polycarbonate resin composition can include the siloxane based compound (b1) in an amount of about 0.1, 0.2, 0.3, 0.4, 0.5, 0.6, 0.7, 0.8, 0.9, 1.0, 1.1, 1.2, 1.3, or 1.4 parts by weight. Further, according to some embodiments of the present invention, the amount of the siloxane based compound (b1) can be in a range from about any of the foregoing amounts to about any other of the foregoing amounts.

In exemplary embodiments of the present invention, the glass fiber reinforced polycarbonate resin composition can include the silicone based resin (b2) in an amount of about 0.1 to about 1.4 parts by weight based on about 100 parts by weight of the glass fiber reinforced polycarbonate (A). In some embodiments, the glass fiber reinforced polycarbonate resin composition can include the silicone based resin (b2) in an amount of about 0.1, 0.2, 0.3, 0.4, 0.5, 0.6, 0.7, 0.8, 0.9, 1.0, 1.1, 1.2, 1.3, or 1.4 parts by weight. Further, according to some embodiments of the present invention, the amount of the silicone based resin (b2) can be in a range from about any of the foregoing amounts to about any other of the foregoing amounts.

(C) Metal Salt Based Flame Retardant

The metal salt based flame retardant (C) can be an organic alkali metal salt compound and/or organic alkaline earth metal salt compound. The metal salt based flame retardant (C), such as an organic alkali metal salt compound and/or organic alkaline earth metal salt compound, can be added to the glass fiber reinforced polycarbonate resin composition of the present invention for the purpose of, for example, improving flame retardancy of the composition.

Various compounds can be given as examples of the organic alkali metal salt compound and/or the organic alkaline earth metal salt compound. In exemplary embodiments, the organic alkali metal salt compound and/or the organic alkaline earth metal salt compound can include an organic acid or organic acid ester having at least one carbon atom.

Examples of the organic acid or organic acid ester include without limitation organic sulfonic acid, organic carboxylic acid, polystyrene sulfonic acid and the like and combinations thereof. Examples of the alkali metal include without limitation sodium, potassium, lithium, cesium and the like. Examples of the alkaline earth metal include without limitation magnesium, calcium, strontium, barium and the like. In exemplary embodiments, a salt of sodium, potassium or cesium can be used. In addition, a salt of the organic acid may be substituted by a halogen atom such as fluorine, chlorine or bromine.

In exemplary embodiments, the alkali metal salt and/or alkaline earth metal salt of an organic sulfonic acid can be an alkali metal salt compound or alkaline earth metal salt compound of a perfluoroalkane sulfonic acid represented by Chemical Formula 3:

$(C_nF_{2n+1}SO_3)_mM$  [Chemical Formula 3]

wherein each n is independently an integer of 1 to 10, M represents an alkali metal such as lithium, sodium, potassium or cesium, or an alkaline earth metal such as magnesium, calcium, strontium or barium, and m represents the valence of M.

Examples of the perfluoroalkane sulfonic acid include without limitation perfluoromethane sulfonic acid, perfluoroethane sulfonic acid, perfluoropropane sulfonic acid, perfluorobutane sulfonic acid, perfluoromethyl butane sulfonic acid, perfluorohexane sulfonic acid, perfluoroheptane sulfonic acid, perfluorooctane sulfonic acid and the like and combinations thereof. In exemplary embodiments, potassium salts thereof can be used as the metal salt based flame retardant.

Additional examples of the metal salt based flame retardant include without limitation, $C_1$-$C_{10}$ alkyl sulfonic acid, benzene sulfonic acid, $C_1$-$C_{10}$ alkylbenzene sulfonic acid, diphenyl sulfonic acid, naphthalene sulfonic acid, 2,4-dichlorobenzene sulfonic acid, 2,4,5-trichlorobenzene sulfonic acid, diphenylsulfone-3-sulfonic acid, diphenylsulfone-3,3'-disulfonic acid, naphthalene trisulfonic acid, fluoro-derivatives thereof and alkali metal salts or alkaline earth metal salts of organic sulfonic acids such as polystyrene sulfonic acid, and the like and combinations thereof. In exemplary embodiments, alkali metal salts or alkaline earth metal salts of perfluoroalkane sulfonic acid and diphenylsulfonic acid can be used.

In exemplary embodiments of the present invention, the alkali metal salt compounds and/or alkaline earth metal salt compounds of polystyrene sulfonic acid include sulfonate group containing aromatic vinyl based resins represented by Chemical Formula 4:

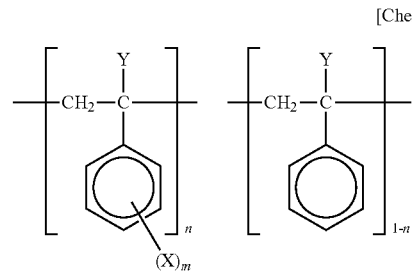

[Chemical Formula 4]

wherein:

each X is the same or different and independently each represents a sulfonate group, m represents an integer of 1 to 5, each Y is the same or different and independently each Y represents hydrogen or $C_1$-$C_{10}$ hydrocarbon group, for example $C_1$-$C_{10}$ alkyl, and n represents a mole fraction, and n satisfies the following formula 0<n≤1.

In Chemical Formula 4, the sulfonate group is an alkali metal salt and/or an alkaline earth metal salt of sulfonic acid. In addition, non-limiting examples of the metal include sodium, potassium, lithium, rubidium, cesium, beryllium, magnesium, calcium, strontium and barium.

In exemplary embodiments, Y is hydrogen or $C_1$-$C_{10}$ hydrocarbon, for example hydrogen or methyl, m is 1 to 5, and n satisfies the relationship of 0<n≤1. That is, each aromatic ring may be substituted with the sulfonate group (X) at each of the five positions, may be substituted with the group at only some of the positions, or may be unsubstituted except for one position.

The flame retardancy of the glass fiber reinforced polycarbonate resin composition according to the present invention may be adjusted by selecting a substitution ratio of the sulfonate, and the substitution ratio of the sulfonate may be adjusted by selecting the amount of the sulfonate group containing aromatic vinyl based resin. In one exemplary embodiment of the present invention, the substitution ratio of the sulfonate may be about 10 to about 100%.

It should be noted that the sulfonate group containing aromatic vinyl based resin is not limited to a polystyrene resin represented by Chemical Formula 4, and may be, for example, a copolymer of the sulfonate group containing aromatic vinyl based resin and any other monomer copolymerizable with a styrene based monomer.

The sulfonate group containing aromatic vinyl based resin can be produced, for example, by (i) a method involving polymerizing or copolymerizing aromatic vinyl based monomers having the sulfonate group and the like, or any other monomers copolymerizable therewith, or (ii) a method involving sulfonating an aromatic vinyl based polymer, a copolymer of an aromatic vinyl based monomer and any other copolymerizable monomer, or a mixture of these polymers and neutralizing the resultant polymer or copolymer with an alkali metal and/or an alkaline earth metal.

For example, in the case of method (ii), a polystyrene sulfone oxide can be produced by adding a mixed liquid of concentrated sulfuric acid and acetic anhydride to a solution of a polystyrene resin in 1,2-dichloroethane and heating the mixture to cause these to react with each other for several hours. Next, the resultant product can be neutralized with the same number of moles of potassium hydroxide or sodium hydroxide as that of sulfonate groups, whereby a potassium salt or sodium salt of polystyrene sulfonic acid can be obtained.

In exemplary embodiments of the present invention, the aromatic vinyl based resin containing sulfonate groups can have a weight average molecular weight of about 1,000 to about 300,000, for example about 2,000 to about 200,000. It should be noted that the weight average molecular weight can be measured by the gel permeation chromatography (GPC) method.

Examples of the organic carboxylic acids include without limitation perfluoroformic acid, perfluoromethane carboxylic acid, perfluoroethane carboxylic acid, perfluoropropane carboxylic acid, perfluorobutane carboxylic acid, perfluoromethyl butane carboxylic acid, perfluorohexane carboxylic acid, perfluoroheptane carboxylic acid, perfluorooctane carboxylic acid and the like, and combinations thereof. Alkali metal salts or alkaline earth metal salts of the organic carboxylic acids are used. The alkali metal salts and alkaline earth metal salts are the same as the above mentioned metal salts.

In exemplary embodiments of the invention, the organic alkali metal salts and/or organic alkaline earth salts can include sulfonic acid alkali metal salts, sulfonic acid alkaline earth metal salts, polystyrene sulfonic acid alkali metal salts, and polystyrene sulfonic acid alkaline earth metal salts.

Anyone of the organic alkali metal salt compounds and/or organic alkaline earth salt compounds may be used alone or in combination.

In exemplary embodiments of the present invention, the glass fiber reinforced polycarbonate resin composition can include the metal salt based flame retardant (C) in an amount of about 0.03 to about 0.5 parts by weight based on about 100 parts by weight of the glass fiber reinforced polycarbonate (A). When the amount of the metal salt based flame retardant (C) is less than about 0.03 parts by weight, the flame retardancy could be deteriorated. In some embodiments, the glass fiber reinforced polycarbonate resin composition can include the metal salt based flame retardant (C) in an amount of about 0.03, 0.04, 0.05, 0.06, 0.07, 0.08, 0.09, 0.1, 0.2, 0.3, 0.4, or 0.5 parts by weight. Further, according to some embodiments of the present invention, the amount of the metal salt based flame retardant (C) can be in a range from about any of the foregoing amounts to about any other of the foregoing amounts.

In exemplary embodiments of the present invention, the metal salt based flame retardant (C) can include potassium perfluorobutane sulfonate, potassium diphenyl sulfone sulfonate, or a combination thereof.

(D) Fluorinated Polyolefin Based Resin

In the present invention, the fluorinated polyolefin based resin is used as an anti-drip agent. Any of the fluorinated polyolefin based resins known in the art as anti-drip agents can be used. In exemplary embodiments of the present invention, the glass fiber reinforced polycarbonate resin composition can include the fluorinated polyolefin based resin (D) in an amount of about 0.1 to about 0.5 parts by weight, based on about 100 parts by weight of the glass fiber reinforced polycarbonate resin (A). In some embodiments, the glass fiber reinforced polycarbonate resin composition can include the fluorinated polyolefin based resin (D) in an amount of about 0.1, 0.2, 0.3, 0.4, or 0.5 parts by weight. Further, according to some embodiments of the present invention, the amount of the fluorinated polyolefin based resin (D) can be in a range from about any of the foregoing amounts to about any other of the foregoing amounts.

The glass fiber reinforced polycarbonate resin composition according to the present invention may further comprise one or more additives. Exemplary additives include without limitation coupling agents, UV absorbers, inorganic additives, flame retardants, lubricants, plasticizers, heat stabilizers, antioxidants, light-stabilizers, pigments, dyes, release agents, and the like, and combinations thereof.

In exemplary embodiments of the present invention, the glass fiber reinforced thermoplastic resin composition has a flame retardancy rating of V0 as measured in accordance with the UL94 flame retardancy test with a specimen thickness of 1.5 mm.

The invention may be better understood by reference to the following examples which are intended for the purpose of illustration and are not to be construed as in any way limiting the scope of the present invention, which is defined in the claims appended hereto.

EXAMPLES

Components used in the following Examples and Comparative Examples will be described more fully hereinafter:

(A) Glass Fiber Reinforced Polycarbonate Resin (a1) Polycarbonate Resin: Bisphenol-A type polycarbonate with a weight average molecular weight of 28,600 g/mol is used.

(a2) Glass Fiber: Glass fiber (product name: SC321-EC10-3) manufactured by KCC Co. with 13 μm filament diameter and 3 mm fiber length is used.

(B) mixture of two kinds of organic silicone based compounds (b1) Siloxane based Compound: Poly-dimethyl-diphenylene siloxane (product name: TSF-433) manufactured by MPM Co. is used.

(b2) Silicone based Resin: Methylphenyl silicone resin (product name: X-40-9805) manufactured by ShinEtsu Co. is used.

(C) Metal Salt based Flame Retardant: Potassium perfluorobutane sulfonate (KPBS, product name: FR-2050) manufactured by 3M Co. is used.

(D) Fluorinated Polyolefin based Resin: Teflon (product name) 7AJ manufactured by Dupont Co. is used.

(E) Heat Stabilizers: IRGANOX-1076 (product name) manufactured by CIBA Co. is used.

(F) Releasing Agent: HI-WAX 400P (product name) manufactured by Mitsui Co. is used.

Examples 1 to 11 and Comparative Examples 1 to 7

The components according to the amount (parts by weight) as shown in Tables 1 and 2 below are mixed and the mixture is extruded through a conventional twin screw extruder (L/D=35, Φ=45 mm) in the form of pellets. The glass fiber is added through another feeder. The pellets are molded into test specimens for measuring mechanical properties and flame retardancy using a 10 oz injection molding machine under the injection temperature of 280 to 300° C. The test specimens are measured for physical properties in accordance with ASTM standards after the specimens are left at 23° C. and 50% relative humidity for 48 hours.

Methods for Measuring Physical Properties

The test specimens are measured for various physical properties as follows and the results are set forth in Tables 1 and 2 below.

(1) Flame retardancy: the flame retardancy is measured using 1.5 mm thick specimens in accordance with UL-94.

(2) Notch Izod Impact Strength: the notch Izod impact strength is measured using ⅛" specimens (⅛ notch, kgf cm/cm) in accordance with ASTM-D256.

(3) Flexural Modulus: the flexural modulus is measured in accordance with ASTM-D790.

(4) HDT: Heat Distortion Temperature (HDT) is measured in accordance with ASTM-D648.

TABLE 1

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Polycarbonate (a1) | | 90 | | | | 80 | | | | 70 | |
| Glass fiber (a2) | | 10 | | | | 20 | | | | 30 | |
| Siloxane based compound (b1) | 0.2 | 0.5 | 0.3 | 0.3 | 0.5 | 1.0 | 0.4 | 0.8 | 0.4 | 0.7 | 0.8 |
| Silicone based resin (b2) | 0.5 | 0.3 | 0.2 | 0.1 | 0.4 | 0.2 | 0.8 | 0.6 | 0.3 | 0.3 | 0.5 |
| Metal salt based flame retardant (C) | 0.1 | 0.1 | 0.1 | 0.1 | 0.1 | 0.1 | 0.1 | 0.1 | 0.1 | 0.1 | 0.1 |
| Fluorinated polyolefin based resin (D) | 0.5 | 0.5 | 0.5 | 0.5 | 0.5 | 0.5 | 0.5 | 0.5 | 0.5 | 0.5 | 0.5 |
| Heat stabilizer (E) | 0.2 | 0.2 | 0.2 | 0.2 | 0.2 | 0.2 | 0.2 | 0.2 | 0.2 | 0.2 | 0.2 |
| Releasing agent (F) | 0.5 | 0.5 | 0.5 | 0.5 | 0.5 | 0.5 | 0.5 | 0.5 | 0.5 | 0.5 | 0.5 |
| IZOD Impact strength (⅛", kgf · cm/cm) | 12.9 | 13.2 | 12.4 | 15.7 | 16.3 | 15.3 | 15.2 | 14.4 | 18.2 | 18.9 | 19.5 |
| Flexural modulus (kgf/cm$^2$) | 38600 | 38200 | 39000 | 53900 | 52300 | 52200 | 52500 | 52200 | 73300 | 72400 | 72600 |
| HDT (° C.) | 139 | 138 | 139 | 143 | 142 | 142 | 142 | 142 | 142 | 142 | 142 |
| UL94 flame retardancy (combustion time) | V0 (21") | V0 (18") | V0 (29") | V0 (42") | V0 (32") | V0 (23") | V0 (25") | V0 (19") | V1 (75") | V0 (38") | V0 (29") |

TABLE 2

| | Comparative Examples | | | | | | |
|---|---|---|---|---|---|---|---|
| | 1 | 2 | 3 | 4 | 5 | 6 | 7 |
| Polycarbonate (a1) | | 90 | | | 80 | | 70 |
| Glass fiber (a2) | | 10 | | | 20 | | 30 |
| Siloxane based compound (b1) | 0.5 | 1.5 | 1.0 | 2.5 | 2.0 | 2.0 | 4.0 |
| Metal salt based flame retardant (C) | 0.1 | 0.1 | 0.1 | 0.1 | 0.15 | 0.1 | 0.1 |
| Fluorinated polyolefin based resin (D) | 0.5 | 0.5 | 0.5 | 0.5 | 1.0 | 0.5 | 0.5 |
| Heat stabilizer (E) | 0.2 | 0.2 | 0.2 | 0.2 | 0.2 | 0.2 | 0.2 |
| Releasing agent (F) | 0.5 | 0.5 | 0.5 | 0.5 | 0.5 | 0.5 | 0.5 |
| IZOD Impact strength (⅛", kgf · cm/cm) | 13.7 | 14.5 | 14.6 | 16.5 | 15.7 | 20.1 | 22.1 |
| Flexural modulus (kgf/cm$^2$) | 37400 | 35400 | 51200 | 49300 | 48700 | 68800 | 67500 |
| HDT (° C.) | 138 | 137 | 142 | 140 | 140 | 141 | 140 |
| UL94 flame retardant (combustion time) | V1 (83") | V0 (28") | V1 (126") | V0 (41") | V1 (55") | V1 (132") | V0 (36") |

As shown in Tables 1 and 2, Examples 1 to 11 using the mixture of polydimethyl diphenylene siloxane and methylphenylsilicone resin can improve the flame retardancy of the composition even when used in a small amount, as compared to Comparative Examples 1 to 7 using polydimethyl diphenylene siloxane alone.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A glass fiber reinforced polycarbonate resin composition comprising:
   (A) a glass fiber reinforced polycarbonate;
   (B) a mixture of two kinds of organic silicone based compounds comprising (b1) a siloxane based compound and (b2) a silicone based resin;
   (C) a metal salt based flame retardant; and
   (D) a fluorinated polyolefin based resin,
   wherein the siloxane based compound (b1) is represented by the following Chemical Formula 1 and the silicone based resin (b2) comprises at least one unit represented by the following Chemical Formula 2:

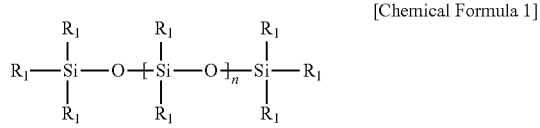

[Chemical Formula 1]

wherein each $R_1$ is the same or different and is independently C1-C8 alkyl, C6-C36 aryl or C1-C8 alkyl substituted C6-C36 aryl; and n represents a number of repeating units and is an integer of 1 to 10,000;

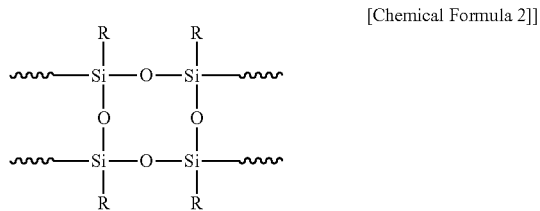

[Chemical Formula 2]

wherein each R is the same or different and is independently hydrogen, C1-C20 alkyl, C6-C36 aryl, or a derivative of C1-C20 alkyl or C6-C36 aryl.

2. The glass fiber reinforced polycarbonate resin composition of claim 1, comprising the mixture of two kinds of organic silicone based compounds (B) in an amount of about 0.2 to about 1.5 parts by weight based on about 100 parts by weight of the glass fiber reinforced polycarbonate resin (A).

3. The glass fiber reinforced polycarbonate resin composition of claim 1, comprising the metal salt based flame retardant (C) in an amount of about 0.03 to about 0.5 parts by weight based on about 100 parts by weight of the glass fiber reinforced polycarbonate resin (A), and further comprising the fluorinated polyolefin based resin (D) in an amount of about 0.1 to about 0.5 parts by weight based on about 100 parts by weight of the glass fiber reinforced polycarbonate resin (A).

4. The glass fiber reinforced polycarbonate resin of claim 1, wherein the glass fiber reinforced polycarbonate resin (A) comprises (a1) about 60 to about 95% by weight of a polycarbonate resin and (a2) about 5 to about 40% by weight of a glass fiber.

5. The glass fiber reinforced polycarbonate resin composition of claim 1, wherein the siloxane based compound (b1) is a poly(dimethyl)(diphenyl) siloxane.

6. The glass fiber reinforced polycarbonate resin composition of claim 1, wherein the silicone based resin (b2) is a methylphenyl silicone resin.

7. The glass fiber reinforced polycarbonate resin composition of claim 1, wherein the metal salt based flame retardant (C) is potassium perfluorobutane sulfonate or potassium diphenylsulfonesulfonate.

8. The glass fiber reinforced polycarbonate resin composition of claim 1, wherein the glass fiber reinforced polycarbonate resin composition has a flame retardancy rating of V0 measured in accordance with the UL94 flame retardancy test with a specimen thickness of 1.5 mm.

9. The glass fiber reinforced polycarbonate resin composition of claim 1, further comprising one or more additives selected from the group consisting of coupling agents, UV absorbers, inorganic additives, flame retardants, lubricants, plasticizers, heat stabilizers, antioxidants, light-stabilizers, pigments, dyes, release agents and combinations thereof.

10. The glass fiber reinforced polycarbonate resin composition of claim 1, comprising a mixture of the siloxane based compound (b1) and the silicone based resin (b2) in an amount of about 0.2 to about 1.5 parts by weight based on about 100 parts by weight of the glass fiber reinforced polycarbonate resin (A).

11. The glass fiber reinforced polycarbonate resin composition of claim 1, comprising a mixture of the siloxane based compound (b1) and the silicone based resin (b2) in an amount of about 0.4 to about 1.4 parts by weight based on about 100 parts by weight of the glass fiber reinforced polycarbonate resin (A).

12. The glass fiber reinforced polycarbonate resin composition of claim 1, comprising the siloxane based compound (b1) in an amount of about 0.1 to about 1.4 parts by weight based on about 100 parts by weight of the glass fiber reinforced polycarbonate (A) and comprising the silicone based resin (b2) in an amount of about 0.1 to about 1.4 parts by weight based on about 100 parts by weight of the glass fiber reinforced polycarbonate (A), wherein the total amount of the mixture of the siloxane based compound (b1) and the silicone based resin (b2) is not greater than about 1.5 parts by weight.

13. The glass fiber reinforced polycarbonate resin composition of claim 12, comprising the siloxane based compound (b1) in an amount of about 0.2 to about 1.0 parts by weight based on about 100 parts by weight of the glass fiber reinforced polycarbonate (A) and comprising the silicone based resin (b2) in an amount of about 0.1 to about 0.8 parts by weight based on about 100 parts by weight of the glass fiber reinforced polycarbonate (A), wherein the total amount of the mixture of the siloxane based compound (b1) and the silicone based resin (b2) is not greater than about 1.5 parts by weight.

* * * * *